United States Patent
Lee et al.

(10) Patent No.: US 12,176,972 B2
(45) Date of Patent: Dec. 24, 2024

(54) SIGNAL DETECTION METHOD AND APPARATUS BASED ON REINFORCEMENT LEARNING FOR VEHICULAR MIMO COMMUNICATION

(71) Applicant: HYUNDAI MOBIS CO., LTD., Seoul (KR)

(72) Inventors: Chung Yong Lee, Seoul (KR); Chae Hun Im, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 811 days.

(21) Appl. No.: 17/330,273

(22) Filed: May 25, 2021

(65) Prior Publication Data

US 2022/0169267 A1    Jun. 2, 2022

(30) Foreign Application Priority Data

Nov. 27, 2020   (KR) .................. 10-2020-0161958
Apr. 27, 2021   (KR) .................. 10-2021-0054255

(51) Int. Cl.
*H04B 7/0413*     (2017.01)
*B60W 50/06*      (2006.01)
(Continued)

(52) U.S. Cl.
CPC .......... *H04B 7/0413* (2013.01); *B60W 50/06* (2013.01); *G06N 7/01* (2023.01); *G06N 20/00* (2019.01); *H04W 4/40* (2018.02); *B60W 2520/10* (2013.01)

(58) Field of Classification Search
CPC ... H04B 7/0413; H04B 7/0848; B60W 50/06; B60W 2520/10; G06N 7/01; G06N 20/00; G06N 3/006; G06N 5/01; H04W 4/40
See application file for complete search history.

(56) References Cited

U.S. PATENT DOCUMENTS 8,000,416 B2    8/2011  Teo et al.
10,637,544 B1 *  4/2020  Shattil .................. H04B 7/0691
(Continued)

FOREIGN PATENT DOCUMENTS

KR    101048976 B1    7/2011
KR    101571103 B1   11/2015
KR    101752491 B1    6/2017

OTHER PUBLICATIONS

Wang et al., C. Multi-User Multi-Hop Relay Networks: Transmission Schemes and Degrees of Freedom, IEEE Transactions on Wireless Communications, vol. 14, No. 8, Aug. 2015, pp. 4582-4596. (Year: 2015).*

(Continued)

*Primary Examiner* — Russell Frejd
(74) *Attorney, Agent, or Firm* — NovoTechIP International PLLC

(57) ABSTRACT

The present exemplary embodiments provide a reinforcement learning based signal detection apparatus and method for vehicular MIMO communication which flexibly adjust the performance and the complexity by applying the reinforcement learning during the MIMO signal detecting process, improving a trade-off relationship between the performance and the complexity of the MIMO signal detection, and controlling the number of episodes of the reinforcement learning in accordance with the speed of the vehicle.

10 Claims, 7 Drawing Sheets

(51) Int. Cl.
    *G06N 7/01*         (2023.01)
    *G06N 20/00*      (2019.01)
    *H04W 4/40*       (2018.01)

(56) References Cited

U.S. PATENT DOCUMENTS

| | | | |
|---|---|---|---|
| 10,797,766 B1* | 10/2020 | Shattil | H04W 72/046 |
| 2010/0062802 A1* | 3/2010 | Amram | H04B 7/026 |
| | | | 455/556.1 |
| 2010/0234071 A1* | 9/2010 | Shabtay | H04B 7/155 |
| | | | 455/562.1 |
| 2013/0157729 A1* | 6/2013 | Tabe | H04W 52/0245 |
| | | | 977/932 |
| 2021/0021307 A1* | 1/2021 | Shattil | H04W 72/046 |

OTHER PUBLICATIONS

Khan et al., H. Reinforcement Learning-Based Vehicle-Cell Association Algorithm for Highly Mobile Millimeter Wave Communication, Google Scholar, IEEE Transactions on Cognitive Communications and Networking, vol. 5, No. 4, Dec. 2019, pp. 1073-1085. (Year: 2019).*

Attia et al., A. MIMO Vehicular Networks: Research Challenges and Opportunities, Google Scholar, Journal of Communications, vol. 7, No. 7, Jul. 2012, pp. 500-513. (Year: 2012).*

* cited by examiner

SIGNAL DETECTION METHOD AND APPARATUS BASED ON REINFORCEMENT LEARNING FOR VEHICULAR MIMO COMMUNICATION

CROSS-REFERENCE TO RELATED APPLICATIONS

This application claims priority to and the benefit of Korean Patent Application No. 10-2020-0161958 filed in the Korean Intellectual Property Office on Nov. 27, 2020, Korean Patent Application No. 10-2021-0054255 filed in the Korean Intellectual Property Office on Apr. 27, 2021, the entire contents of which are incorporated herein by reference.

TECHNICAL FIELD

A technical field of the present disclosure relates to a signal detection apparatus and method for vehicular MIMO communication.

BACKGROUND ART

The contents described in this section merely provide background information on the present exemplary embodiment but do not constitute the related art.

A vehicular multiple input multiple output (MIMO) communication system is configured by a transmission device Tx including N antennas and a reception device Rx equipped with M antennas in a designated coverage of the transmission device Tx. The transmission device and the reception device may be configured by various elements such as vehicles, pedestrians, or base station infrastructures in accordance with a vehicular to everything (V2X) application.

In the related art, in order to alleviate the complexity, a zero-focusing method or a minimum mean square error (MMSE) method of detecting a signal by multiplying a reception signal by a linear filter has been considered.

Even though a linear filter based signal detecting technique has a low complexity, there is a problem in that a signal detection performance is low. The MIMO signal detecting technique of the related art has a significant trade off relationship between the performance and the complexity so that it is not suitable for a vehicular communication system which requires ultra-reliable and low latency communication. Further, the performance and the complexity of the MIMO signal detection method of the related art are fixed for every technique so that the MIMO signal detection method of the related art is not appropriate for the vehicular communication system which requires various latency times and reliability.

RELATED ART DOCUMENT

Patent Document

Patent Document 1: U.S. Pat. No. 8,000,416 (Aug. 16, 2011)
Patent Document 2: KR 10-1048976 (Jul. 6, 2011)
Patent Document 3: KR 10-1571103 (Nov. 17, 2015)
Patent Document 4: KR 10-1752491 (Jun. 23, 2017)

SUMMARY OF THE INVENTION

A major object of the exemplary embodiments of the present disclosure is to apply reinforcement learning during an MIMO signal detecting process, improve the trade-off relationship between the performance and the complexity of MIMO signal detection, and control the number of episodes of the reinforcement learning according to a speed of the vehicle to flexibly control the performance and the complexity.

Other and further objects of the present invention which are not specifically described can be further considered within the scope easily deduced from the following detailed description and the effect.

According to an aspect of the present embodiment, a signal detection apparatus for vehicular multiple input multiple output (MIMO) communication includes: an antenna which receives a reception signal using a radio frequency; and a signal processor which detects a transmission signal by performing reinforcement learning on a transmission/reception relationship in which a relationship of a channel matrix, the transmission signal, and a reception noise are represented by the reception signal.

The signal processor factorizes the channel matrix into a unitary matrix and a lower triangular matrix and reconstructs the transmission/reception relationship using the unitary matrix.

The signal processor may calculate a detection criterion of the transmission signal from the reconstructed transmission/reception relationship.

The signal processor applies the Markov decision process to the reconstructed transmission/reception relationship and defines a state, an action, and a reward in accordance with the Markov decision process to detect the transmission signal.

The signal processor defines an action with a number of real part sets in a constellation of the transmission signal as an index.

The reward uses the detection criterion of the transmission signal calculated from the reconstructed transmission/reception relationship and applies a minus operator such that the smaller a signal detection error, the larger the reward.

The signal processor controls the complexity and the performance of the signal detection by adjusting the number of learning episodes of the reinforcement learning in accordance with the speed of the vehicle.

According to another aspect of the present embodiment, a signal detection method for vehicular multiple input multiple output (MIMO) communication includes reconstructing a transmission/reception relationship in which a relationship of a channel matrix, a transmission signal, and a reception noise is represented with the reception signal; applying the Markov decision process to the reconstructed transmission/reception relationship; learning a state-action value function defined in accordance with the Markov decision process; and detecting the transmission signal by means of the state-action value function.

In the applying of the Markov decision process, an action with a number of real part sets in a constellation of the transmission signal as an index is defined.

In the learning of the state-action value function, the complexity and the performance of the signal detection are controlled by adjusting the number of learning episodes of the state-action value function in accordance with the speed of the vehicle.

As described above, according to the exemplary embodiments of the present disclosure, it is possible to apply reinforcement learning during an MIMO signal detecting process, improve the trade-off relationship between the performance and the complexity of MIMO signal detection, and control the number of episodes of the reinforcement learning according to a speed of the vehicle to flexibly control the performance and the complexity.

Even if the effects are not explicitly mentioned here, the effects described in the following specification which are expected by the technical features of the present disclosure and their potential effects are handled as described in the specification of the present disclosure.

DETAILED DESCRIPTION OF THE EMBODIMENT

Hereinafter, in the description of the present disclosure, a detailed description of the related known functions will be omitted if it is determined that the gist of the present disclosure may be unnecessarily blurred as it is obvious to those skilled in the art and some exemplary embodiments of the present disclosure will be described in detail with reference to exemplary drawings.

Figure 1:
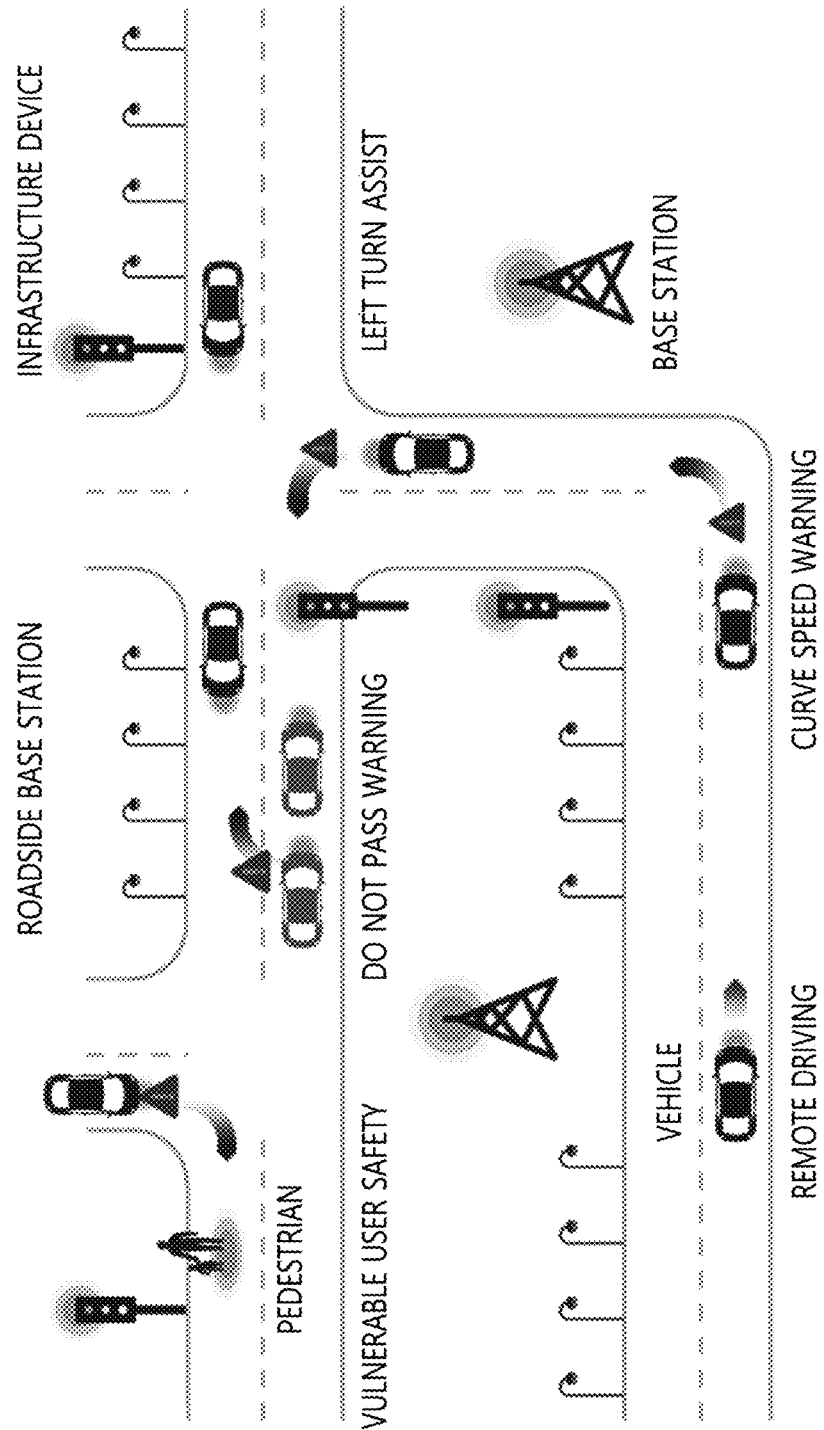
FIG. 1 is a view illustrating various V2X applications and scenarios.

FIG. 1 is a view illustrating various V2X applications and scenarios.

FIG. 1 illustrates a vehicular multiple input multiple output (MIMO) communication system configured by a transmission device Tx including N antennas and a reception device Rx equipped with M antennas in a designated coverage of the transmission device Tx. The transmission device and the reception device may be configured by various elements such as vehicles, pedestrians, or base station infrastructures in accordance with a V2X application. Further, a wireless communication used for the vehicular MIMO communication system of the present disclosure may be used in accordance with various communication standards such as cellular mobile communication (LTE or NR) and wireless LAN (IEEE802.11p and IEEE802.11bd). For example, a next-generation mobile communication such as 5G or 6G may be applied.

A transmission and reception relationship in the MIMO communication system equipped with N transmission antennas and M reception antennas is represented by Equation 1.

$$\tilde{y} = \tilde{H}\tilde{x} + \tilde{n} \quad \text{[Equation 1]}$$

Here, $\tilde{y} \in \mathbb{C}^{M \times 1}$ is a reception signal vector, $\tilde{x} \in \mathbb{C}^{N \times 1}$ is a transmission signal vector, $\tilde{H} \in \mathbb{C}^{M \times N}$ is a channel matrix, and $\tilde{n} \in \mathbb{C}^{M \times 1}$ is a reception noise vector. In Equation 1, an element $\tilde{h}_{i,j}$ of an i-th row and a j-th column of the channel matrix $\tilde{H}$ indicates a channel distortion between a j-th transmission antenna and an i-th reception antenna. Further, an i-th element $\tilde{n}_i$ of the reception noise vector $\tilde{n}$ indicates a noise signal received by the i-th reception antenna. A real part and an imaginary part are separated in Equation 1 formed of a complex number to be reconstructed by a transmission/reception relationship formed of a real number value as represented in Equation 2.

$$y = Hx + n \Longleftrightarrow \begin{bmatrix} \mathfrak{R}(\tilde{y}) \\ \mathfrak{I}(\tilde{y}) \end{bmatrix} = \begin{bmatrix} \mathfrak{R}(\tilde{H}) & -\mathfrak{I}(\tilde{H}) \\ \mathfrak{I}(\tilde{H}) & \mathfrak{R}(\tilde{H}) \end{bmatrix} \begin{bmatrix} \mathfrak{R}(\tilde{x}) \\ \mathfrak{I}(\tilde{x}) \end{bmatrix} + \begin{bmatrix} \mathfrak{R}(\tilde{n}) \\ \mathfrak{I}(\tilde{n}) \end{bmatrix} \quad \text{[Equation 2]}$$

Here, $\mathfrak{R}(\bullet)$ is an operator which takes a real part and $\mathfrak{I}(\bullet)$ is an operator which takes an imaginary part.

An optimal transmission signal detection criterion based on maximum likelihood estimation in Equation 2 is represented in Equation 3.

$$\hat{x}_{ML} = \underset{x \in X^{2N}}{\arg\min} \|y - Hx\|^2 \quad \text{[Equation 3]}$$

Here, $\hat{X}$ is a detection signal and X is a real part set in a constellation of the transmission signal. Even though an optimal detection performance may be obtained by the detection criterion of Equation 3, the number of cases of all transmission signals needs to be fully searched so that a very high complexity is required. Accordingly, in the related art, in order to alleviate the complexity, a zero-focusing method or a minimum mean square error (MMSE) method of detecting a signal by multiplying a reception signal by a linear filter has been considered.

$$\hat{X}_{\{CF,MMSE\}} = G_{\{XF,MMSE\}} y \quad \text{[Equation 4]}$$

However, even though a linear filter based signal detecting technique has a low complexity, there is a problem in that a signal detection performance is low. As described above, the MIMO signal detecting technique of the related art has a significant trade off relationship between the performance and the complexity so that it is not suitable for a vehicular communication system which requires ultra-reliable and low latency communication.

Further, the performance and the complexity of the MIMO signal detection method of the related art are fixed for every technique so that the MIMO signal detection method of the related art is not appropriate for the vehicular communication system which requires various latency times and reliability.

According to the present disclosure, the above-mentioned problems are solved by changing the MIMO task to a Markov decision process (MDP) task. The present disclosure proposes a reinforcement learning based signal detection apparatus and method for a vehicular MIMO communication system which improve the trade-off relationship between the performance and the complexity of the MIMO signal detection and flexibly adjust the performance and the complexity.

Figure 2:
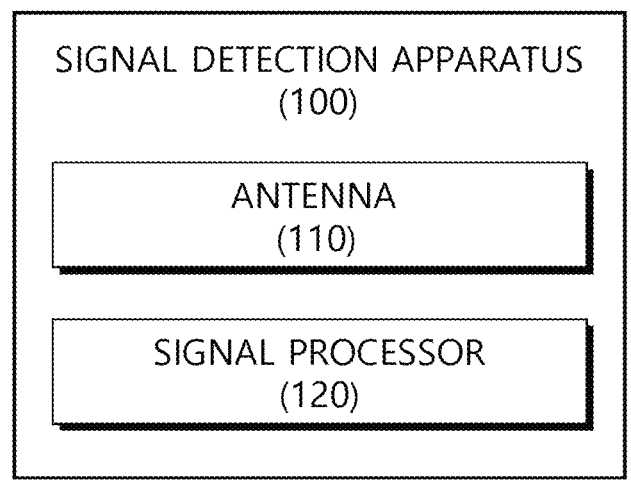
FIG. 2 is a block diagram illustrating a signal detection apparatus according to an exemplary embodiment of the present disclosure.

FIG. 2 is a block diagram illustrating a signal detection apparatus according to an exemplary embodiment of the present disclosure.

A signal detection apparatus 100 for a vehicular multiple input multiple output (MIMO) communication includes an antenna 110 and a signal processor 120. The signal detection apparatus may be implemented by a transmitter, a receiver, or a system in which the transmitter and the receiver are combined.

The antenna 110 receives receptions signals using a radio frequency.

The signal processor 120 detects a transmission signal by reinforcement learning with respect to a transmission/reception relationship in which a relationship of a channel matrix, a transmission signal, and a reception noise is represented by a reception signal.

In order to detect a signal by applying the reinforcement learning to the MIMO communication system, the transmission/reception relationship of Equation 2 needs to be analyzed by a Markov decision process.

The signal processor factorizes the channel matrix into an unitary matrix and a lower triangular matrix and reconstructs the transmission/reception relationship using the unitary matrix. The channel matrix H is factorized to QL as represented in Equation 5.

$$H = QL$$

$$Q \in \mathbb{R}^{2M \times 2N}, L \in \mathbb{R}^{2N \times 2N} \qquad \text{[Equation 5]}$$

Here, $Q \in \mathbb{R}^{2M \times 2N}$ is a unitary matrix and $L \in \mathbb{R}^{2N \times 2N}$ is a lower triangular matrix. The unitary matrix Q obtained by QL factorization is multiplied to a left side and a right side of Equation 2 to reconstruct the MIMO transmission/reception relationship as represented in Equation 6.

$$z \triangleq Q^T y = Lx + Q^T n = Lx + \bar{n} \qquad \text{[Equation 6]}$$

The signal processor calculates a detection criterion of the transmission signal from the reconstructed transmission/reception relationship. An optimal transmission signal detection criterion from the transmission/reception relationship of Equation 6 is given as represented in Equation 7.

$$\hat{x} = \underset{x_l \in X}{\operatorname{argmin}} \sum_{n=1}^{2N} \left( z_n - \sum_{l=1}^{n} L_{n,l} x_l \right)^2 \qquad \text{[Equation 7]}$$

Here, $z_n$ indicates an n-th element of Z and $L_{n,j}$ indicate an element in an n-th row and l-th column. In the transmission/reception relationship of Equation 2 of the related art, all transmission signals interfere with each other. However, in Equation 6 obtained by QL factorization, the interference is caused only by the transmission signal of adjacent antennas so that it may be analyzed as a Markov decision process. Only a symbol of a previous antenna index may be processed to affect the next antenna.

The signal processor applies the Markov decision process to the reconstructed transmission/reception relationship and defines a state, an action, and a reward in accordance with the Markov decision process to detect a transmission signal.

Figure 3:
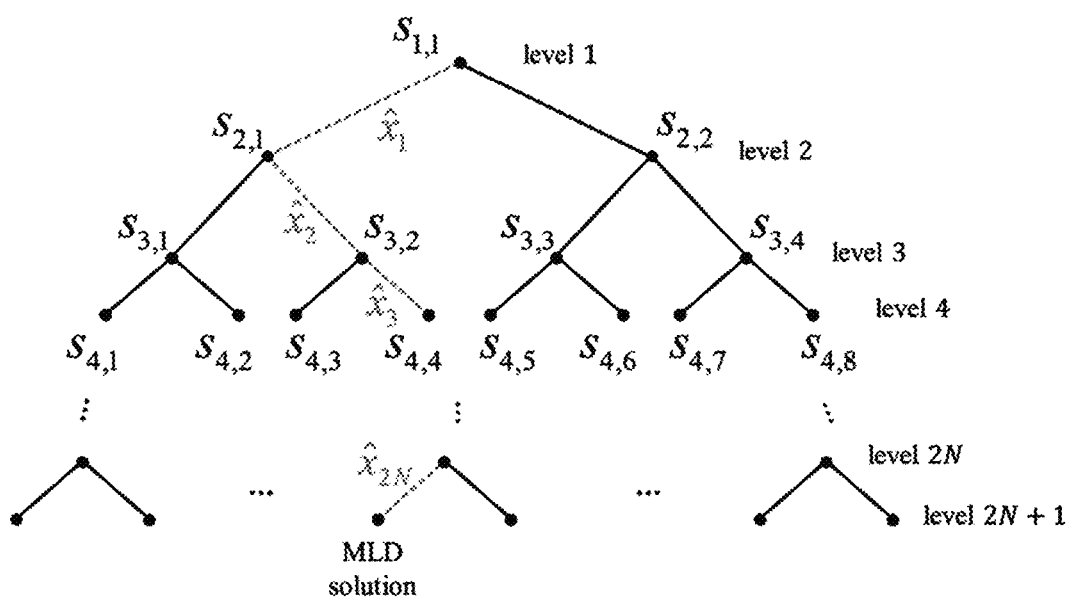
FIG. 3 is a view illustrating a decision tree for a situation in which a 4-QAM modulation is applied to an MIMO communication system with N transmission antennas to be processed by a signal detection apparatus according to an exemplary embodiment of the present disclosure.

The signal detecting process in Equation 6 may be represented with a decision tree in accordance with the Markov decision process, as illustrated in FIG. 3.

FIG. 3 is a view illustrating a decision tree for a situation in which a 4-QAM modulation is applied to an MIMO communication system with N transmission antennas to be processed by a signal detection apparatus according to an exemplary embodiment of the present disclosure;

In the decision tree of FIG. 3, a state, an action, and a reward are defined as follows to build a reinforcement learning environment. A state set $\mathcal{S} = \{S_{1,1}, S_{2,1}, \ldots, S_{i,j}, \ldots\}$ formed by nodes of the decision tree is defined. Here, $s_{i,j}$ represents a state of a j-th node of an i-th level of the decision tree. An action set $\mathcal{A} = \{1, 2, \ldots, |\chi|\}$ with a number of a real part set (X) of a constellation of a signal as an index is defined. For example, if it is assumed that an action $a(t) \in \mathcal{A}$ is performed in a current state s(t) at a level t and then moves to a next state s(t+1), the performed actions are continuously collected to detect a transmission signal $\hat{X}$. At this time, a policy function $\pi(s(t))$ for determining an optimal action a(t) in the current state s(t) is given by Equation 8.

$$\pi(s(t)) = \underset{a(t) \in \mathcal{A}}{\operatorname{argmax}} Q^*(s(t), a(t)) \qquad \text{[Equation 8]}$$

Here, $Q^*(s(t), a(t))$ represents an optimal state-action value function for the state s(t) and the action a(t). In order to learn the optimal state-action value function, $Q^*(s(t), a(t))$ is repeatedly updated based on the reward based on Bellman equation as represented in Equation 9.

$$Q(s(t), a(t)) \leftarrow \qquad \text{[Equation 9]}$$
$$Q(s(t), a(t)) + \alpha [r(t) + \gamma \underset{a}{\max} Q(s(t+1), a(t)) - Q(s(t), a(t))]$$

Here, $\alpha \in (0,1)$ is a learning rate and $\gamma \in (0,1)$ is a depreciation rate. At this time, the reward r(t+1) acquired after performing the action a(t) is defined by Equation 10 in accordance with Equation 7.

$$r(t) = -\left( z_t - \sum_{l=1}^{t} L_{t,l} \hat{x}_l \right)^2 \qquad \text{[Equation 10]}$$

In Equation 10, a minus operator is taken so that the smaller the signal detection error, the larger the reward is received. Finally, the process of learning the optimal policy function to detect the MIMO information according to the exemplary embodiment of the present disclosure may be summarized as illustrated in FIG. 4.

Figure 4:
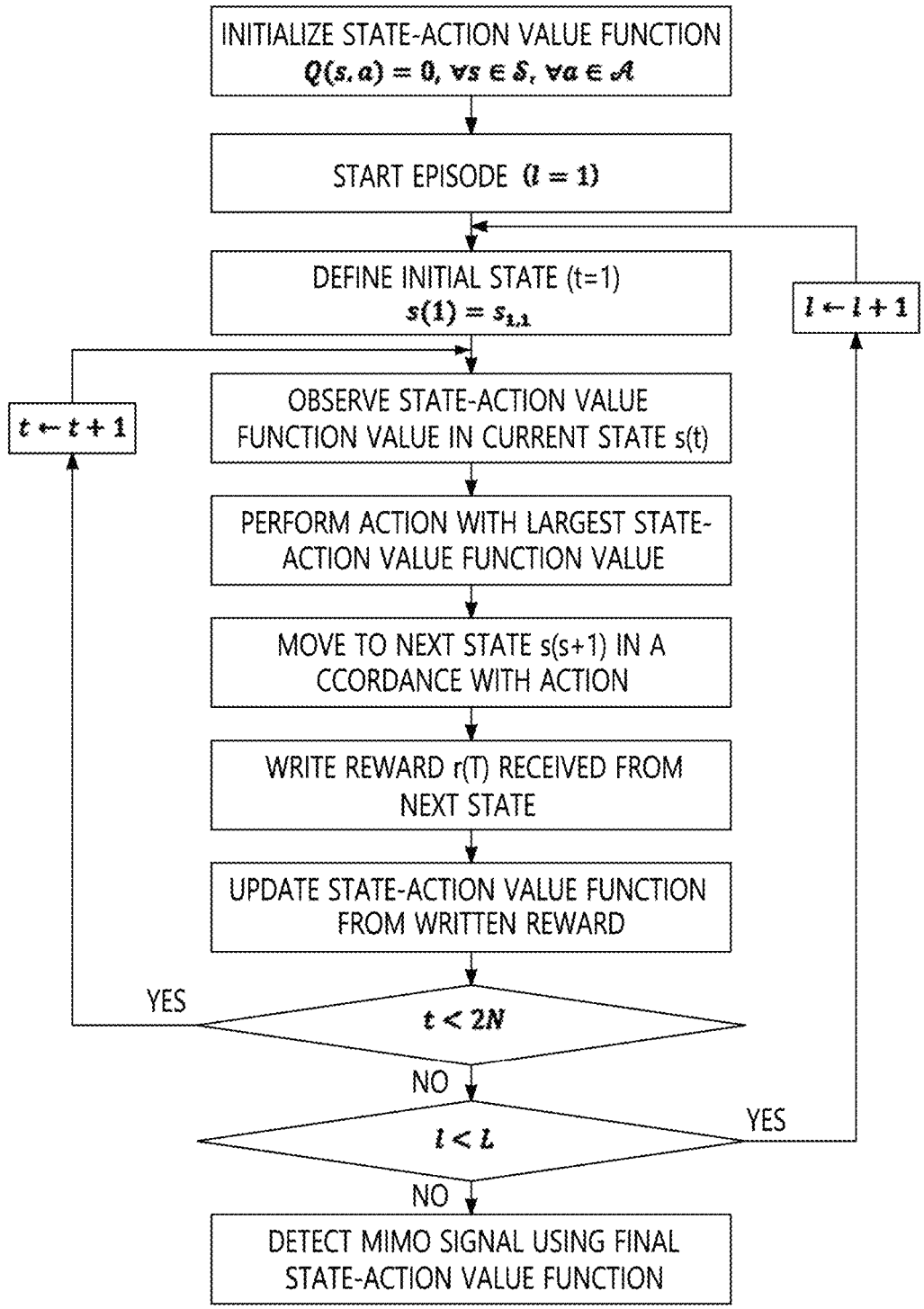
FIG. 4 is a view illustrating a learning operation of a state-action value function to be processed by a signal detection apparatus according to an exemplary embodiment of the present disclosure.

FIG. 4 is a view illustrating a learning operation of a state-action value function to be processed by a signal detection apparatus according to an exemplary embodiment of the present disclosure.

Generally, a high speed of the vehicle may cause severe distortion due to the wireless channel so that it is very important to increase the reliability of the signal detection. The reliability of the signal detection may be ensured while considering the current situation of the vehicle by determining an appropriate number of learning episodes in accordance with the speed of the vehicle in advance to be mapped to a table and adaptively applying the number of learning episodes in accordance with the speed of the running vehicle. The number of learning episodes is determined in advance in accordance with the V2X application to flexibly adjust the reliability and the complexity in accordance with various V2X scenarios.

Figure 5:
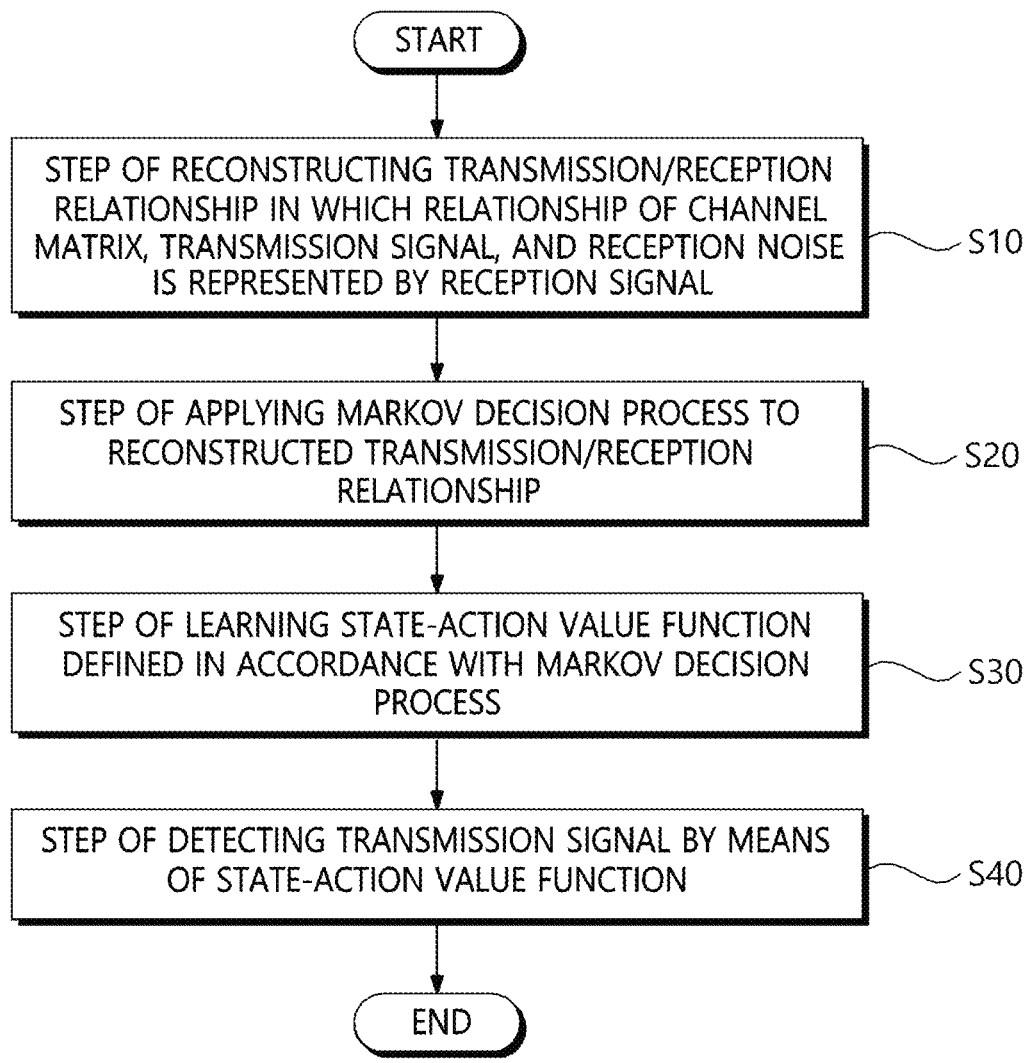
FIG. 5 is a flowchart illustrating a signal detection method according to another exemplary embodiment of the present disclosure.

FIG. 5 is a flowchart illustrating a signal detection method according to another exemplary embodiment of the present disclosure. The signal detection method for vehicular MIMO communication may be performed by the signal detection apparatus for vehicular MIMO communication.

In step S10, a transmission/reception relationship in which a relationship of a channel matrix, a transmission signal, and a reception noise is represented with the reception signal is reconstructed.

In step S20, the Markov decision process is applied to the reconstructed transmission/reception relationship. In the step S20 of applying the Markov decision process, an action with the number of real part set in the constellation of the transmission as an index is defined.

In step S30, the state-action value function defined in accordance with the Markov decision process is learned. In the step S30 of learning the state-action value function, the number of learning episodes of the state-action value function is adjusted in accordance with the speed of the vehicle to control the complexity and the performance of the signal detection.

In step S40, the transmission signal is detected by the state-action value function.

A simulation was performed to compare the MIMO signal detecting performances of the related art and the present disclosure. Variables used for the simulation is represented in Table 1.

TABLE 1

| Variables | Value |
| --- | --- |
| Number of transmission antennas | N = 4 |
| Number of reception antennas | M = 4 |
| Wireless channel | Rayleigh fading channel |
| Modulation | 16-QAM |
| Learning rate | α = 0.5 |
| Depreciation rate | γ = 0.9 |

Figure 6:
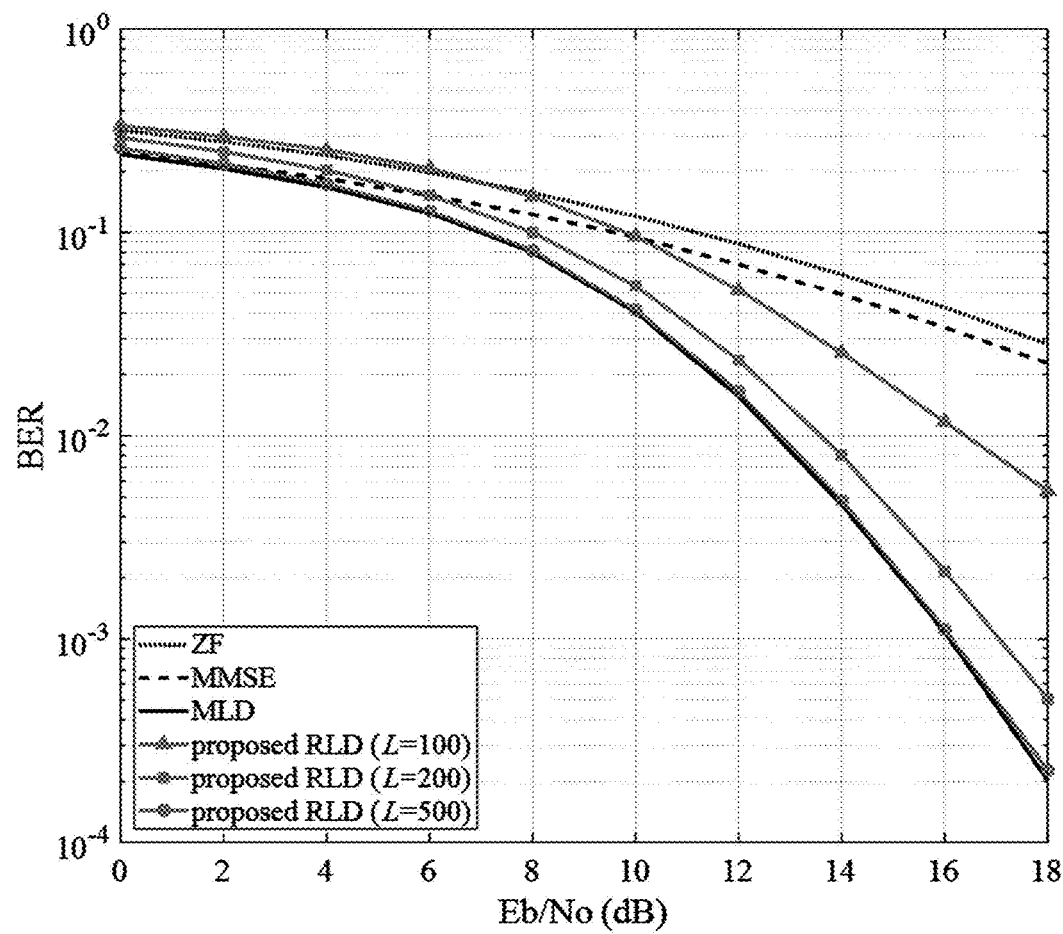
FIG. 6 is a view illustrating a bit error rate according to an energy per bit to noise ratio ($E_b/N_0$) as a simulation result of exemplary embodiments of the present disclosure.
Figure 7:
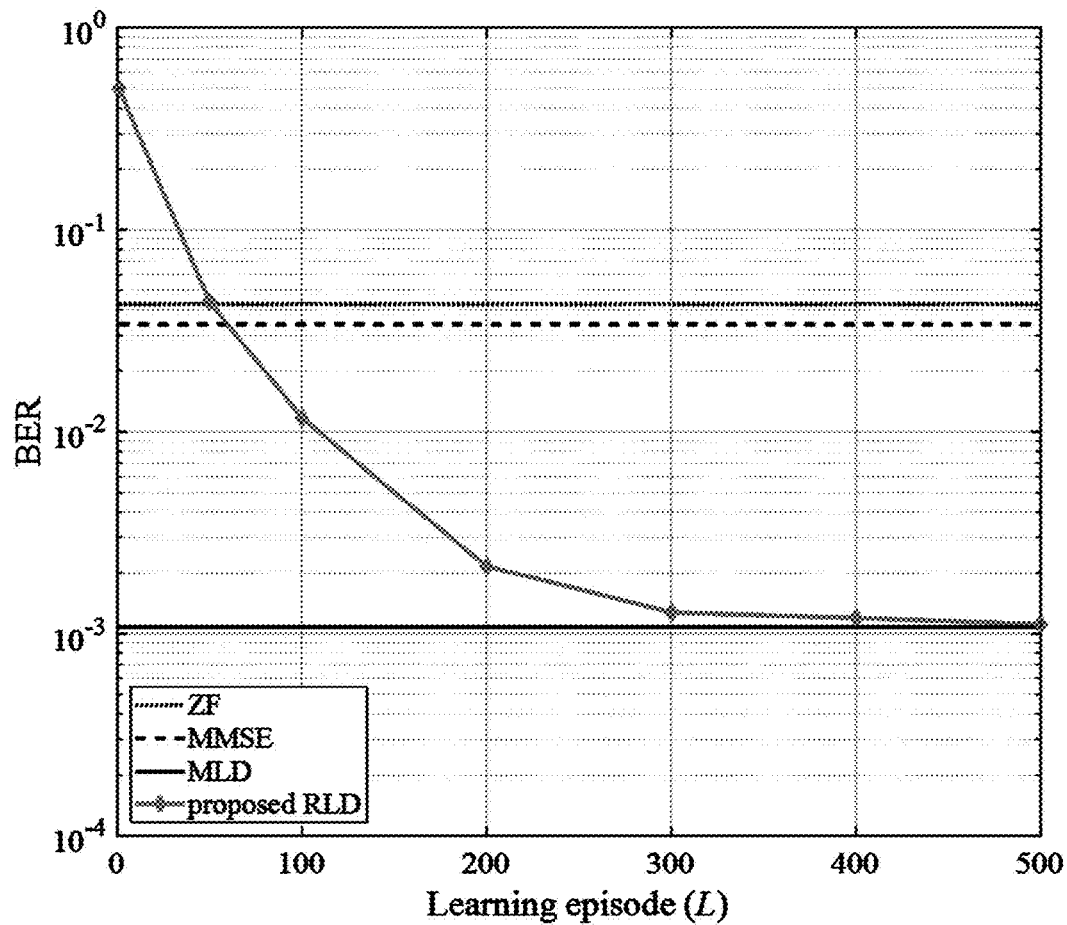
FIG. 7 is a view illustrating a bit error rate performance according to a learning episode as a simulation result of exemplary embodiments of the present disclosure.

FIG. 6 illustrates a bit error rate (BER) performance according to an energy per bit to noise ratio ($E_b/N_0$) of ZF, MUSE, MLD (maximum likelihood detection) signal detection techniques and a reinforcement learning-based detection (RLD) signal detection technique of the present disclosure. FIG. 7 illustrates a bit error rate performance in accordance with the increase of the number L of learning episodes when the energy per bit to noise ratio ($E_b/E_0$) is 16 dB.

The larger the number L of learning episodes, the higher the transmission signal detection performance. Specifically, when the learning episodes were 50 or more, the signal detection performance was higher than that of ZF and MMSE and the optimal MLD performance was achieved in the vicinity of 500 learning episodes. For example, the number of learning episodes is initialized to be approximately 300, and then gradually reduced to 50 or gradually increased to 500 in accordance with the situation. That is, it was confirmed that the complexity and the performance of the MIMO signal detection were flexibly adjusted by adjusting the number of learning episodes and the optimal MLD performance was achieved with a low complexity.

Accordingly, the present disclosure may be considered as a signal detection method appropriate for the vehicular MIMO communication system which requires ultra-reliable and low latency communication.

The signal detection apparatus may include at least one processor, a computer readable recording medium, and a communication bus.

The processor may be controlled to operate as a signal detection apparatus. For example, the processor may execute one or more programs stored in the computer readable storage medium. One or more programs may include one or more computer executable command and the computer executable command may be configured to allow the signal detection apparatus to perform the operations according to the exemplary embodiments when it is executed by the processor.

The computer readable storage medium is configured to store a computer executable command or program code, program data and/or other appropriate format of information. The program stored in the computer readable storage medium includes a set of commands which are executable by the processor. In one exemplary embodiment, the computer readable storage medium may be a memory (a volatile memory such as a random access memory, a non-volatile memory, or an appropriate combination thereof), one or more magnetic disk storage devices, optical disk storage devices, flash memory devices, and another format of storage mediums which is accessed by the signal detection apparatus and stores desired information, or an appropriate combination thereof.

The communication bus connects various components of the signal detection apparatus including the processor and the computer readable storage medium.

The signal detection apparatus may include one or more input/output interfaces and one or more communication interfaces which provide an interface for one or more input/output devices. The input/output interface and the communication interface are connected to the communication bus. The input/output device may be connected to the other components of the signal detection apparatus via the input/output interface.

The signal detection apparatus may be implemented in a logic circuit by hardware, firm ware, software, or a combination thereof or may be implemented using a general purpose or special purpose computer. The apparatus may be implemented using hardwired device, field programmable gate array (FPGA) or application specific integrated circuit (ASIC). Further, the apparatus may be implemented by a system on chip (SoC) including one or more processors and a controller.

The signal detection apparatus may be mounted in a computing device or a server provided with a hardware element as a software, a hardware, or a combination thereof. The computing device or server may refer to various devices including all or some of a communication device for communicating with various devices and wired/wireless communication networks such as a communication modem, a memory which stores data for executing programs, and a microprocessor which executes programs to perform operations and commands.

In FIG. 5, the respective processes are sequentially performed, but this is merely illustrative and those skilled in the art may apply various modifications and changes by changing the order illustrated in FIG. 5 or performing one or more processes in parallel or adding another process without departing from the essential gist of the exemplary embodiment of the present disclosure.

The operation according to the exemplary embodiment of the present disclosure may be implemented as a program instruction which may be executed by various computers to be recorded in a computer readable medium. The computer readable medium indicates an arbitrary medium which participates to provide a command to a processor for execution. The computer readable medium may include solely a program command, a data file, and a data structure or a combination thereof. For example, the computer readable medium may include a magnetic medium, an optical recording medium, and a memory. The computer program may be distributed on a networked computer system so that the computer readable code may be stored and executed in a distributed manner. Functional programs, codes, and code segments for implementing the present embodiment may be easily inferred by programmers in the art to which this embodiment belongs.

The present embodiments are provided to explain the technical spirit of the present embodiment and the scope of the technical spirit of the present embodiment is not limited by these embodiments. The protection scope of the present embodiments should be interpreted based on the following appended claims and it should be appreciated that all technical spirits included within a range equivalent thereto are included in the protection scope of the present embodiments.

What is claimed is:

1. A signal detection apparatus for vehicular multiple input multiple output (MIMO) communication, comprising:
   an antenna configured to receive a reception signal using a radio frequency; and
   a signal processor configured to detect a transmission signal by performing reinforcement learning on a transmission/reception relationship in which a relationship of a channel matrix, the transmission signal, and a reception noise is represented by the reception signal.

2. The signal detection apparatus according to claim 1, wherein the signal processor is configured to factorize the channel matrix into a unitary matrix and a lower triangular matrix and reconstruct the transmission/reception relationship using the unitary matrix.

3. The signal detection apparatus according to claim 2, wherein the signal processor is configured to calculate a detection criterion of the transmission signal from the reconstructed transmission/reception relationship.

4. The signal detection apparatus according to claim 3, wherein the signal processor is configured to apply a Markov decision process (MDP) to the reconstructed transmission/reception relationship and define a state, an action, and a reward in accordance with the MDP to detect the transmission signal.

5. The signal detection apparatus according to claim 4, wherein the signal processor is configured to define an action with a number of real part sets in a constellation of the transmission signal as an index.

6. The signal detection apparatus according to claim 4, wherein the reward uses the detection criterion of the transmission signal calculated from the reconstructed transmission/reception relationship and applies a minus operator such that the smaller a signal detection error, the larger the reward.

7. The signal detection apparatus according to claim 1, wherein the signal processor is configured to control a complexity and performance of the signal detection apparatus by adjusting a number of learning episodes of the reinforcement learning in accordance with a speed of a vehicle.

8. A signal detection method for vehicular multiple input multiple output (MIMO) communication comprising operating a signal detection apparatus to perform:
   reconstructing a transmission/reception relationship in which a relationship of a channel matrix, a transmission signal, and a reception noise is represented with a reception signal;
   applying a Markov decision process (MDP) to the reconstructed transmission/reception relationship;
   learning a state-action value function defined in accordance with the MDP; and
   detecting, using the signal detection apparatus, the transmission signal by means of the state-action value function.

9. The signal detection method according to claim 8, wherein applying the MDP to the reconstructed transmission/reception relationship includes defining an action with a number of real part sets in a constellation of the transmission signal as an index.

10. The signal detection method according to claim 8, wherein learning the state-action value function includes controlling a complexity and performance of the signal detection by adjusting a number of learning episodes of the state-action value function in accordance with a speed of a vehicle.

* * * * *